US008681203B1

(12) United States Patent
Yin et al.

(10) Patent No.: US 8,681,203 B1
(45) Date of Patent: Mar. 25, 2014

(54) AUTOMATIC MUTE CONTROL FOR VIDEO CONFERENCING

(75) Inventors: Li Yin, Redmond, WA (US); Hong Zhang, Redmond, WA (US); Zhe Wang, Sammamish, WA (US)

(73) Assignee: Google Inc., Mountain View, CA (US)

( * ) Notice: Subject to any disclaimer, the term of this patent is extended or adjusted under 35 U.S.C. 154(b) by 144 days.

(21) Appl. No.: 13/589,831

(22) Filed: Aug. 20, 2012

(51) Int. Cl.
*H04N 7/15* (2006.01)

(52) U.S. Cl.
USPC ................... 348/14.08; 348/14.09; 348/14.12

(58) Field of Classification Search
USPC ................... 348/14.01–14.16; 370/260–261; 379/202.01; 709/204
IPC .............................................. H04N 7/147,7/15
See application file for complete search history.

(56) References Cited

U.S. PATENT DOCUMENTS

| | | | |
|---|---|---|---|
| 6,317,776 B1 * | 11/2001 | Broussard et al. | 709/204 |
| 6,369,846 B1 * | 4/2002 | Katsumi | 348/14.01 |
| 7,843,486 B1 | 11/2010 | Blair et al. | |
| 2003/0198328 A1 * | 10/2003 | Li | 379/202.01 |
| 2006/0055771 A1 * | 3/2006 | Kies | 348/14.03 |
| 2006/0248210 A1 * | 11/2006 | Kenoyer | 709/231 |
| 2008/0266384 A1 * | 10/2008 | Triplicane et al. | 348/14.09 |
| 2009/0174764 A1 * | 7/2009 | Chadha et al. | 348/14.09 |
| 2010/0020954 A1 * | 1/2010 | Gilg et al. | 379/202.01 |

\* cited by examiner

*Primary Examiner* — Melur Ramakrishnaiah
(74) *Attorney, Agent, or Firm* — Shumaker & Sieffert, P.A.

(57) ABSTRACT

In one example, a device executes one or more video communication processes that receive audio streams and video streams from a plurality of computing devices participating in a video communication session associated with the one or more video communication processes. The device evaluates one or more properties of the audio streams, including the volume of an audio signal among the audio streams. The device selects a first group of the audio streams to mute in the video communication session, based at least in part on the one or more properties of the audio streams. The device distributes a second group of the audio streams in the video communication session, while muting the first group of audio streams in the video communication session.

20 Claims, 5 Drawing Sheets

AUTOMATIC MUTE CONTROL FOR VIDEO CONFERENCING

BACKGROUND

Computers may be used for video conferencing, in which users on different computing devices equipped with microphones and cameras. A video conferencing system conveys audio and video data among the different devices. Two or more participants are then able to see and hear each other from remote locations.

SUMMARY

In general, this disclosure includes an intelligent automatic mute feature for a video conferencing application. During video conferencing, side conversations of those who are not addressing the other participants or background noises in the audio inputs can distract from or disrupt the intended speaker at any point in time. The more participants there are in a video conferencing session, the more audio inputs there are, and the more possibilities for extraneous noises to be distributed in the video conferencing session. Individual participants may try to address this issue by manually muting their audio inputs, but manually muting and unmuting one's own audio input may be distracting or tedious, and various participants may not reliably mute their audio input when appropriate, such that other participants to a video conferencing session may still be exposed to distracting sounds from someone who isn't manually muting their input. In various examples discussed below, an intelligent mute feature may automatically mute video conferencing participants who aren't addressing the other participants and whose audio inputs might otherwise be a source of distracting or disrupting noise, while allowing the video conferencing application to continue distributing the audio inputs from one or more intended speakers to the other participants.

In one example, a method includes executing one or more video communication processes that receive audio streams and video streams from a plurality of computing devices participating in a video communication session associated with the one or more video communication processes. The method further includes evaluating one or more properties of the audio streams from the plurality of computing devices, the one or more properties comprising a volume of an audio signal among the audio streams. The method further includes selecting a first group of the audio streams from the plurality of computing devices to mute in the video communication session, based at least in part on the one or more properties of the audio streams. The method further includes distributing a second group of the audio streams from the plurality of computing devices in the video communication session, while muting the first group of audio streams from the plurality of computing devices in the video communication session.

In another example, a computing device includes at least one processor, at least one data storage device, at least one network interface, and machine-readable code stored on the at least one data storage device. The machine-readable code includes executable instructions that are executable by the at least one processor. The machine-readable code thereby configures the at least one processor to receive audio streams and video streams via the network interface from a plurality of client computing devices participating in a video communication session associated with one or more video communication processes. The machine-readable code further configures the at least one processor to evaluate one or more properties of the audio streams from the plurality of client computing devices. The machine-readable code further configures the at least one processor to select a first group of the audio streams to refrain from distributing to the client computing devices in the video communication session, based at least in part on one or more properties of the audio streams from the plurality of client computing devices. The machine-readable code further configures the at least one processor to distribute the video streams in the video communication session via the network interface. The machine-readable code further configures the at least one processor to distribute a second group of the audio streams in the video communication session via the network interface, while refraining from distributing the first group of the audio streams in the video communication session.

In another example, a computer-readable storage medium includes executable instructions that include a video communication module and a smart mute module. The video communication module, when executed by a computing device, configures at least one processor of the computing device to receive audio streams and video streams via a network interface from a plurality of client computing devices participating in a video communication session associated with the video communication module. The smart mute module, when executed by a computing device, configures at least one processor of the computing device to evaluate one or more properties of the audio streams from the plurality of client computing devices; select a first group of the audio streams from the plurality of client computing devices to refrain from distributing in the video communication session, based at least in part on the one or more evaluated properties of the audio streams from the plurality of client computing devices; and indicate to the video communication module to refrain from distributing the first group of audio streams from the plurality of client computing devices. The video communication module, when executed by a computing device, further configures at least one processor of the computing device to distribute a second group of the audio streams from the plurality of client computing devices in the video communication session, while refraining from distributing the first group of the audio streams from the plurality of client computing devices in the video communication session.

The details of one or more embodiments are set forth in the accompanying drawings and the description below. Other features, objects, and advantages will be apparent from the description and drawings, and from the claims.

BRIEF DESCRIPTION OF DRAWINGS

In accordance with common practice, the various described features are not drawn to scale and are drawn to emphasize one or more features relevant to the present application. Like reference characters denote like elements throughout the figures and text.

DETAILED DESCRIPTION

Figure 1:
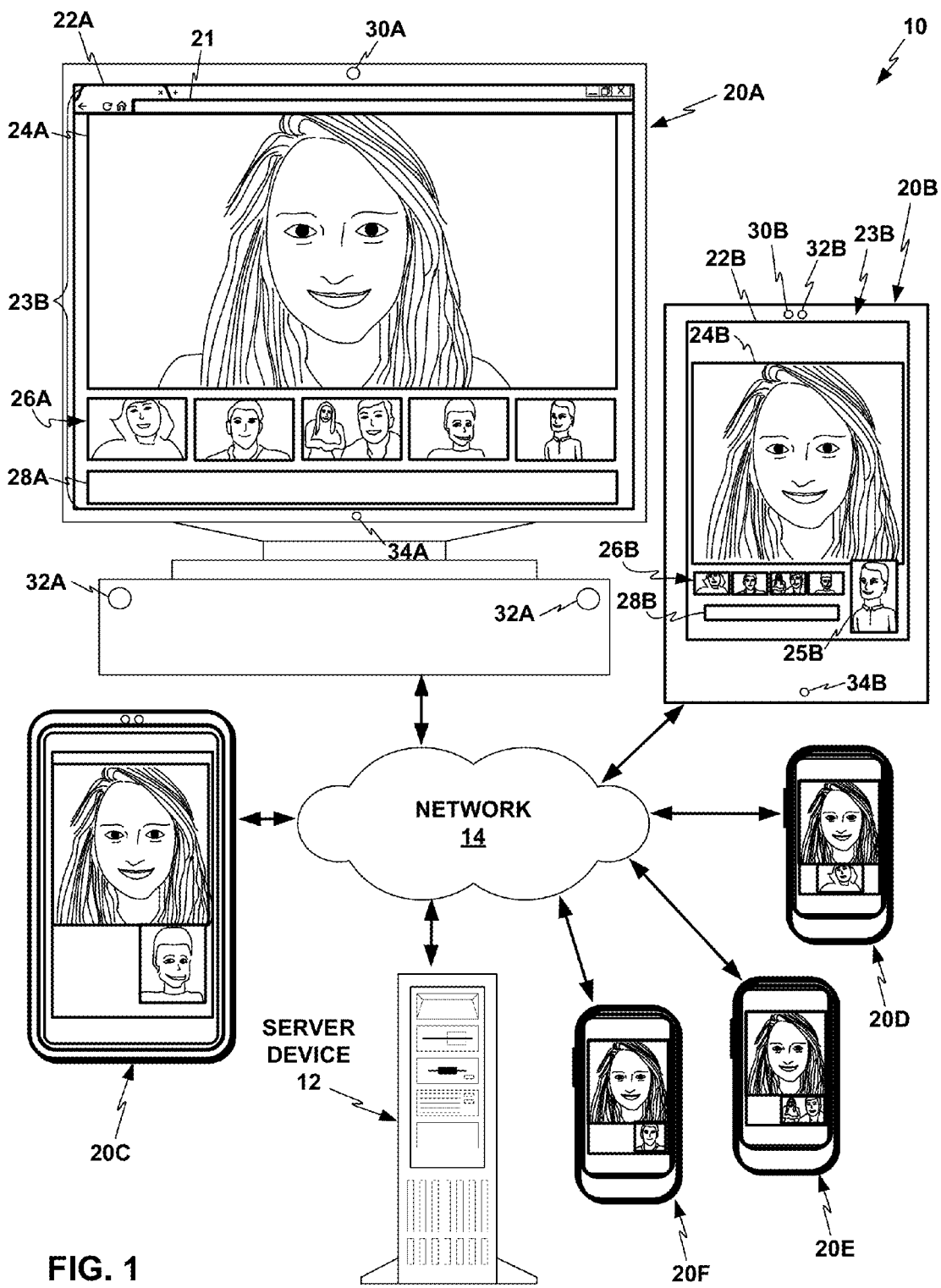
FIG. 1 is a schematic diagram illustrating an example of a system in which multiple computing devices are communicatively coupled to a video conferencing session with automatic mute control that may be executed on a server device, in accordance with illustrative aspects of this disclosure.

Video conferencing may provide a richer and more natural venue for remote communication among two or more participants than other available alternatives, such as a telephone conference or email. Businesses or other enterprises with people in different locations may use video conferencing to quickly and naturally communicate information with each other. According to aspects of this disclosure, a video communication application provides video conferencing capability among participants at two or more locations. A video communication application may convey video and audio data from each of the participants in a video communication session to each of the other participants. However, the more participants there are in a video communication session, the more audio signals may be distributed to all the other participants. If one or more of the participants is also engaging in more or less intermittent conversation at their own location, or is in an environment where other people are conversing in the background, or otherwise has ambient noise from their environment, these unhelpful sounds may be fed to the audio feeds for all the other participants in the video communication session.

Any of the users may be able to address this issue by manually muting their own audio input. However, it may become inconvenient and annoying for a given participant to manually mute their audio input, particularly if the participant wants to communicate with the other participants, and/or their side conversations or background noise at their location are intermittent, and the participant has to manually activate and deactivate the mute on their audio input over and over. Additionally, one or more of the participants may forget to mute or not think of manually muting their audio signal when they engage in side conversations or experience intrusive background noise at their location, and the potentially unhelpful or intrusive sounds are conveyed to all the other participants in the video communication session, interfering with those who are trying to convey and listen to the contents of the video communication session, despite the existence of the capability for manual mute in the video communication application.

In various examples, a system of this disclosure resolves these issues by providing an automatic audio mute on participants in a video communication session. In one example described as follows, one or more video communication applications, video communication background processes, or other video communication processes may be implemented in a web application hosted on a server device and may include a smart mute functionality, which may be provided by a smart mute module or algorithm as part of the video communication application or other video communication process. The smart mute module may evaluate one or more properties of the audio streams from each of the participants in a video communication session. For example, the smart mute module may evaluate who the current intended speaker is in the video communication session, or it may distinguish when an audio stream is conveying side conversations or background noise that are likely to interfere with the other participants' experience of the video communication session. Based on the one or more properties it evaluates from each of the audio streams, the smart mute module may select one or more of the participants' audio streams to automatically mute. The smart mute module in this example may thereby automatically make the video communication session more orderly, easier to understand clearly, and a more helpful and more enjoyable experience for its participants.

A video communication session as used herein is a broad term encompassing as its plain and ordinary meaning, including but not limited to, one or more objects, which may be stored in and/or are executable by hardware, which may enable video communication clients coupled to the one or more objects to exchange information. The one or more objects may include data and/or provide functionality of a video communication session as described herein.

The video communication session may enable multiple participants not only to see and speak with each other, but also to share, navigate through, and make edits to documents, share and watch videos, share and listen to audio feeds, play games, and browse the internet together, among other modes of interacting and sharing content. Video communication sessions may support multi-way audio and/or video communication. For example, client devices associated with participants may send audio and/or video streams to a server device that may forward the audio and/or video streams to the other client devices coupled to the video communication session. Client devices receiving the audio and/or video streams may output the audio and/or video streams to the users of the client devices.

As used throughout this disclosure, headings are included to improve the clarity of the disclosure and are not necessarily used to define separate embodiments. In some examples, features of various embodiments may be combined and/or used from among contents discussed under multiple headings in accordance with aspects of the present disclosure.

FIG. 1 is a block diagram illustrating an example of a video communication system 10 including a server device 12 and multiple computing devices 20A, 20B, 20C, 20D, 20E, 20F (collectively referred to herein as "computing devices 20A-F") in communication with server device 12 over network 16, thereby enabling computing devices 20A-F to participate with each other in a real-time video communication session, i.e., a video conferencing session. Aspects of a video communication process may be loaded and running on server device 12 and on each of computing devices 20A-F. For example, a video communication module may run as all or part of a web application running on server device 12, with client video communication modules running on computing devices 20A-F, in accordance with one or more aspects of the present disclosure. Server device 12 may execute a video communication process that receives audio streams and video streams from computing devices 20A-F that participate in a video communication session associated with the video communication process. The video communication process running on server device 12 may distribute the video streams from each of the computing devices in the video communication session, while distributing at least a group of one or more of the audio streams in the video communication session, as further explained below.

The video communication process may be or include a video communication application (including, e.g., a web application, a client application, etc.), a video communication module, a video communication background process, or other video communication background process. While a single server device 12 is illustratively depicted, the functions of server device 12 may be distributed among multiple server devices, which may also be hosted in one or more data centers, for example. While many examples herein are discussed in terms of a video communication application, each of these is also illustrative of and applicable to any type of video communication process.

In the examples depicted in FIG. 1, computing device 20A is a desktop computer, computing devices 20B and 20C are tablet computers, and computing devices 20D-F are smartphones. As shown in FIG. 1, each of computing devices 20A-F is displaying video feeds of participants in a video communication session, or video conferencing session, with each other. While six particular computing devices 20 are illustratively depicted in the example of FIG. 1, in other examples, two, three, ten, or any number of computing devices of any type may participate in a video communication system. Computing devices 20A-F or other computing devices included in a video communication session may include any of a variety of different types of computing devices, such as smartphones, tablet computers, laptop computers, desktop computers, servers, processor-enabled televisions, gaming consoles, portable media players, e-book readers, smart wristwatches, and any other type or form factor of computing device.

As a particular example, computing device 20A includes a display screen 22A displaying a graphical user interface (GUI) for a video communication client application, i.e. a client GUI 23A, that includes multimedia content 24A, participant panel 26A, and control panel 28A. Client GUI 23A may include graphical elements such as text, video feeds, and visual data. The graphical elements displayed by client GUI 23A may more generally include any visually perceptible representation. Multimedia content 24A shows a video feed for the user of computing device 20A, who is one of the participants in the video communication session, and who is currently the focus of attention in the video communication session. Participant panel 26A displays smaller-sized video feeds of the other participants in the video communication session, i.e. the users of the other computing devices 20B-F. Participant panel 26A may also display a smaller-sized video feed of the user's own video input at other times during the video communication session, e.g. when she is not the focus of attention in the video communication session.

Control panel 28A provides graphical user interface elements, such as icons and/or widgets, enabling the user to enter various inputs for controlling the video communication session and/or the user's participation in it. Client GUI 23A is rendered in a web browser in the example of computing device 20A, and includes address bar 21, where a user may enter a URL for accessing the video communication process running on server device 12. Computing device 20A receives video streams from the other computing devices 20B-F, as distributed by server device 12, and renders the video feeds depicted in client GUI 23A based on those video streams. Computing device 20A also includes speakers 32A, and similarly receives audio streams from one or more of the other computing devices 20B-F, as distributed by server device 12, and provides audio feeds through speakers 32A based on those audio streams. Display screen 22A and speakers 32A are illustrative examples of output devices for computing device 20A, while any of a variety of other output devices may also be used, such as separate, peripheral video and audio output equipment that may be physically or wirelessly connected to or in communication with computing device 20A. This may include separate or additional 2D or 3D video display screens or monitors and/or separate stand-alone speakers, for example.

Computing device 20A further includes a camera 30A that may be configured for capturing video data, such as real-time video data of the user of computing device 20A, and sending the video data in a video stream to server device 12. Computing device 20A also includes a microphone 34A, that may capture audio data in the presence of computing device 20A, such as spoken word audio inputs from the user of computing device 20A, and sending the audio data in a real-time audio stream to server device 12. Camera 30A and microphone 34A are illustrative examples of input devices for computing device 20A, while any of a variety of other input devices may also be used, such as separate, peripheral video and audio recording equipment that may be physically or wirelessly connected to or in communication with computing device 20A.

The example of computing device 20B is a mobile tablet computing device and has a somewhat different client GUI 23B rendering on its display screen 22B. Computing device 20B runs a dedicated client video communication application, as opposed to accessing the video communication web application through a web browser as with computing device 20A. Similarly to client GUI 23A on computing device 20A, client GUI 23B also displays a large-sized multimedia content 24B currently showing the video feed for the user of computing device 20A. Client GUI 23B also displays a participant panel 26B, but unlike the example of client GUI 23A, client GUI 23B also includes a source video feed 25B that shows the video feed from computing device 20B itself, i.e., showing the user of computing device 20B. The user may then be able to see and keep track of how he appears in his own video feed to the other participants in the video communication session. Participant panel 26B currently shows the other users besides the users of computing devices 20A and 20B. Client GUI 23B also displays control panel 28B.

Computing devices 20C-F are illustratively shown with still other variations of client GUIs, that include a larger-size multimedia content taking up most of the real estate of their display screens, plus a smaller-sized source video feed, each showing the device's own video feed back to its user, but no participant panel. Computing devices 20C-F may include any of a variety of different kinds of computing devices running any of a variety of different operating systems and client application versions and configurations for participating in the video communication session. These computing devices 20C-F may also have the capability of displaying a participant panel, or a control panel, but simply may have those features turned off in the view illustratively depicted in FIG. 1. In other implementations, computing devices may run video communication client applications that lack one or more of these features, or that also include other features besides those illustratively depicted here.

Figure 2:
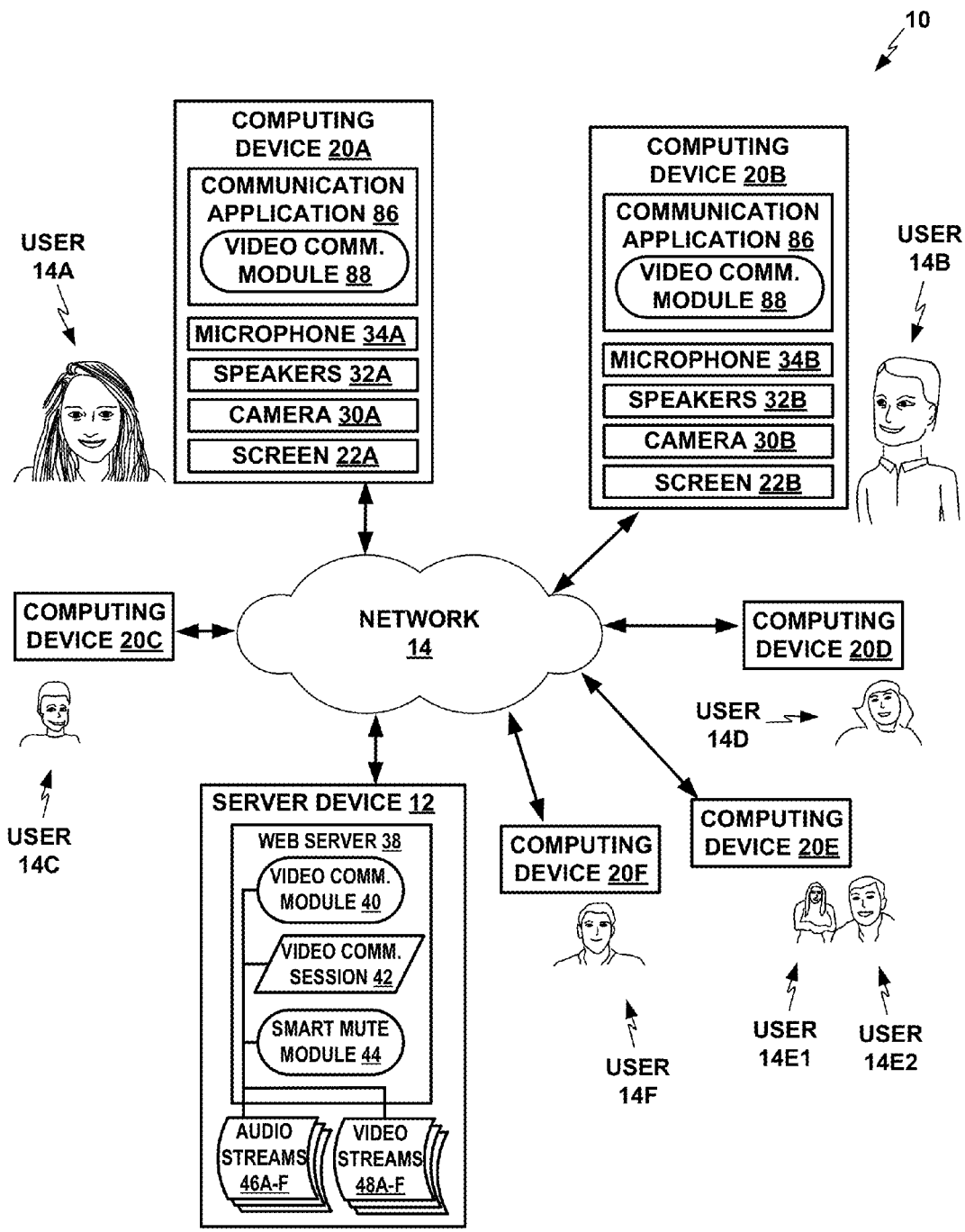
FIG. 2 is a schematic diagram illustrating further details of the example system of FIG. 1 in which multiple computing devices are communicatively coupled to a video conferencing session with automatic mute control that may be executed on a server device, in accordance with illustrative aspects of this disclosure.

FIG. 2 depicts video communication system 10 with further details for computing devices 20A and 20B and server 12. Computing devices 20C-F may also include the elements specifically depicted for computing devices 20A and 20B, or any of computing devices 20A-F may include more or fewer components or other variations or combinations of components. FIG. 2 also depicts users 14A-F using computing devices 20A-F, respectively. In particular, computing device 20A is being used by user 14A, computing device 20B is being used by user 14B, and computing devices 20C-F are being used by users 14C, 14D, 14E1, 14E2, and 14F respectively (collectively referred to as "users 14A-14F"), to participate with each other in a video communication session.

Computing devices 20A-F are all communicatively connected with server 12 through network 16, which may be the Internet, a local area network (LAN), or any other network or combination of networks. Network 16 connecting computing devices 20A-F with server device 12 may include wired or wireless communication channels capable of sending and receiving communication data. Network 16 may include a network connection using a Transmission Control Protocol and Internet Protocol (TCP/IP) protocol stack, or a User Datagram Protocol (UDP) network connection over IP, or other Internet Layer and Transport Layer protocols. Network 16 may include the Internet, a local-area network (LAN), an enterprise network, a wireless network, a 3G wireless network, a cellular network, a telephony network, a Wi-Fi network, a wide area network (WAN), a WiMAX network, one or more other types of networks, or a combination of two or more different types of networks (e.g., a combination of a cellular network and the Internet). Network 16 may incorporate any of a wide variety of servers, gateways, routers, other network nodes, and wired or wireless communication channels capable of communicating data. Users 14A-14F are each depicted proximate to their own computing devices 20A-F, which enable the users 14A-F to video conference with each other from separate locations, whether in different rooms of the same building or in separate locations anywhere in the world.

Computing devices 20A-F and server device 12 may exchange audio streams 46A-F of audio data for audio feeds collected by computing devices 20A-F, and video streams 48A-F of video data for video feeds collected by computing devices 20A-F over network 16. In various example, computing devices 20A-F and server device 12 may exchange audio streams 46A-F and video streams 48A-F using any of a variety of Application Layer protocols on top of TCP or UDP for communicating the video and audio data as well as requests, responses, controls, and negotiating the connection, such as Real Time Streaming Protocol (RTSP), Real-time Transport Protocol (RTP), Real-time Control Protocol (RTCP), Hypertext Transfer Protocol (HTTP), and/or Hypertext Transfer Protocol Secure (HTTPS), for example. In various examples, the video streams 48A-F may be encoded in a format such as H.263 or H.264. In other examples, other protocols or formats may be used. In other examples, some or all of audio streams 46A-F and video streams 48A-F may be transferred encrypted, such as, for example, using Secure Real-time Transport Protocol (SRTP), or any other encrypted transfer protocol.

Computing devices 20A-F may each include a communication application 86 that includes, cooperates with, or runs a client-side video communication module 88. Any one or more of computing devices 20A-F may run a different version or configuration of communication application 86, such as different versions for different operating systems, for example. Video communication module 88 may be a portion of communication application 86, a plug-in for communication application 86, a separate application, or may involve any of these or other arrangements. For example, in computing device 20A, communication application 86 may be a web browser application and video communication module 88 may be a plug-in for the web browser application that enables video communication in the web browser. As another example, in computing device 20B, video communication module 88 may be a stand-alone application that may be downloaded separately and launched from its own icon on a home screen, and may make use of other computing resources on computing device 20B represented by communication application 86.

As also shown in FIG. 1, each of computing devices 20A-F also includes user input and output components, illustratively represented in computing devices 20A and 20B, with computing device 20A comprising microphone 34A, speakers 32A, camera 30A, and screen 22A, and computing device 20B comprising microphone 34B, speakers 32B, camera 30B, and screen 22B. Any of computing devices 20A-F may use any kind of user input/output devices for collecting audio and video data and providing audio and video outputs, including for a video communication session. Various user input/output components may be detachable or not an integrated part of a given computing device 20, but the computing device 20 may still be configured to have user input/output components operably connected to them, such as with connectors, jacks, drivers, processing cards, or other elements allowing audio and/or video input and/or output components to be operably connected, with either a hardline or wireless connection. Any of computing devices 20A-F may also include or be attached to any of a variety of additional user input/output components, such as video projectors, keyboards, keypads, buttons, mice, trackpads, trackballs, joysticks, compression sensors, etc. For computing device 20B, or for any applicable computing device, the display screen 22 may be a presence-sensitive screen, i.e. a touchscreen.

Server device 12 may include one or more server hardware devices, and may include one or multiple processors. Software executing on server device 12 may execute on a single processor or may execute on multiple processors (e.g., for distributed or multi-threaded processing). Server device 12 runs web server 38, which includes a video communication module 40. Video communication module 40 may be a web application or a part of a web application that enables video communication sessions 42 for video conferencing. Web server 38 also includes smart mute module 44, which may be part of the same web application as video communication module 40, or part of video communication module 40, or may be a separate application that communicates with video communication module 40. Video communication module 40 may set up, manage, and later tear down video communication sessions, including representative video communication session 42 that video communication module 40 has set up to connect users 14A-F in the example depicted in FIG. 2.

For example, user 14A may initially use computing device 20A to connect with video communication module 40 on server device 12 and enter inputs to cause video communication module 40 to initiate a video communication session 42. User 16A may then invite or permit other users 14B-F to join video communication session 42. The other users 14B-F may also connect with video communication module 40 and video communication session 42 on server device 12. Client-side video communication modules 88 running on computing devices 20A-F may establish audio and video connections with server-side video communication module 40 running on server device 12. Computing devices 20A-F and server device 12 may then send and receive audio streams 46A-F and video streams 48A-F to each other for video communication session 42. Server-side video communication module 42 may dynamically update which computing devices 20A-F are connected to video communication session 42, and update the display in client GUIs 23 on computing devices 20A-F accordingly, such as by adding or removing a participant icon in a participant panel 26 in client GUIs 23 when a user joins in or quits video communication session 42.

Users 14A-F may also use computing devices 20A-F to send and receive any of a variety of other types of data in video communication session 42, such as document data in a document module or application for sharing and viewing a document together, for example. This may be a presentation document or a word processing document that may be displayed in the client GUIs on computing devices 20A-F, for example.

Video communication module 40 running on server device 12 may then receive audio streams 46A-F and video streams 48A-F from computing devices 20A-F respectively. Audio streams 46A-F and video streams 48A-F may include spoken word and other voice inputs and video images in real-time from users 14A-F respectively.

Smart mute module 44 may evaluate one or more properties of the audio streams 46A-F. Smart mute module 44 may then potentially select a first group of one or more of the audio streams to mute, i.e. to refrain from distributing, in the video communication session 42, based at least in part on the one or more properties it has evaluated of the audio streams 46A-F. In this example, smart mute module 44 may then indicate to video communication module 40 to mute the selected audio streams, i.e. to refrain from distributing in the video communication session 42 the selected first group of audio streams that smart mute module 44 has selected for muting.

Smart mute module 44 thereby provides a capability for automatically muting any one or more audio streams among audio streams 46A-F from any one or more of computing devices 20A-F, based on criteria it uses for evaluating whether to mute one or more of the audio streams. For example, the smart mute module 44 may distinguish audio streams that encode audio signals that are mainly quiet, or that include intermittent side conversation or background noise, as opposed to an audio stream that encodes a participant clearly speaking to the other participants in the video communication session 42. Smart mute module 44 may select those audio streams that convey side conversation or background noise to mute, while distributing, or refraining from muting, audio streams that convey spoken word content with properties consistent with being intended for the video communication session 42, in this example.

As part of this example, smart mute module 44 may evaluate an average volume of an audio signal of one or more of the audio streams 46A-F, where the average volume corresponds to the volume, loudness, or intensity of the audio input captured by a microphone or other audio input device of the source computing device 20. Smart mute module 44 may evaluate the average volume over multiple intervals of time, where each interval may be between one and ten seconds inclusive, or some other interval appropriate for evaluating whether the audio stream conveys a clear human speaker or a lack thereof, side conversations, background noise, or other likely possibilities.

As a particular example, user 14A may be clearly speaking to the other users 14B-F participating in video communication session 42, while the other users 14B-F are listening to user 14A. Smart mute module 44 may evaluate audio signals 46A-F and identify audio stream 46A as having the highest average volume, potentially by a meaningful margin, from among audio signals 46A-F, in this example. Smart mute module 44 may evaluate only the volume in the audio signals for the audio streams 46A-F, or smart mute module 44 may also evaluate other properties of 46A-F. Smart mute module 44 may conclude that audio stream 46A conveys an audio signal with a consistently moderate volume and/or that is otherwise consistent with clearly articulated, steadily delivered human speech, while audio streams 46B-F convey audio signals with low volume and/or that are otherwise consistent with ambient noise, and that may have occasional signals consistent with side conversations or intrusive background noises. Smart mute module 44 may then select audio streams 46B-F to mute, i.e. to refrain from distributing in video communication session 42, while smart mute module 44 continues to allow video communication module 40 to distribute audio stream 46A in the video communication session.

User 14A may naturally pause in her speech from time to time, and the pauses may sometimes be several seconds long. Smart module 44 may evaluate audio stream 46A from user 14A's computing device 20A over multiple intervals of time, such as in rolling averages of five or ten second intervals at a time, for example, and refrain from concluding from a pause of several seconds that audio stream 46A no longer represents an intended speaker in video communication session 42. On the other hand, if audio stream 46A shows a decrease in volume or other characteristics of its audio signal consistent with just ambient-level background noise for over intervals of time, such as ten seconds, for example, smart module 44 may conclude that user 14A is no longer an intended speaker in video communication session 42. Smart mute module may evaluate for a decrease in volume over any of various intervals of time, such as between one and ten seconds inclusive, for example, or any interval of time that is indicative of a relevant transition in intended speaker in the video communication session 42. Smart module 44 may then implement an appropriate change in video communication session 42, such as to un-mute or release the mute on audio signals 46B-F and begin distributing all the audio streams 46A-F, until subsequent evaluation shows a good reason for another change in its automatic muting selections.

Smart mute module 44 may, on the other hand, also evaluate for an increase in volume in the audio signal of an audio stream that is currently muted, as a potential criterion for automatically unmuting that audio stream. This may be useful when one of the muted participants interrupts or interjects, or begins intentionally addressing the other participants in some other way. The automatic mute feature may still allow for quickly and automatically unmuting a participant who suddenly begins speaking in a way intended for the other participants, without having to wait for or override the automatic mute feature to be heard. In one illustrative example, the smart mute module 44 may detect an increase in volume in an audio signal in audio stream 46B, for example, which may be among a group of audio streams 46B-F previously selected to mute and to refrain from distributing. In response to detecting the increase in volume in the audio signal in audio stream 46B, smart mute module 44 may quickly and automatically begin distributing audio stream 46B in the video communication session 42, potentially quickly enough that neither user 14B nor the other participants notice any lag time in his automatic mute being released and his audio stream 46B being distributed to the other participants.

Smart mute module 44 may also use audio signal analysis and comparison techniques for evaluating not just volume, but more specific properties of the audio signal. Smart mute module 44 may compare the audio signal from any of audio streams 46A-F with properties of a single, clearly articulated human speaker, properties of jumbled or low-level human speech from multiple speakers, or properties of ambient noise or other forms of background noise, for example. Smart mute module 44 may be programmed with libraries of examples of each of these types of audio signals, or simplified representations of categories of signals. Smart mute module 44 may also be trained to recognize each of these or other types of audio signals using techniques of pattern recognition or machine learning, in various examples. In various examples, smart mute module 44 may evaluate audio streams 46A-F to determine whether the audio streams 46A-F are conveying human speech from a single speaker. Smart mute module 44 may then select at least one of the audio streams 46A-F that smart mute module 44 determines is not conveying human speech from a single speaker, to mute and to refrain from distributing.

In some examples, smart mute module 44 may also evaluate the video streams 48A-F that accompany the audio streams 46A-F, and also use information from the video streams 48A-F in selecting audio streams to mute. For example, smart mute module 44 may evaluate one or more of the video streams 48A-F to determine whether the video streams are conveying video data that represents a human figure. Smart mute module 44 may incorporate the idea that if the video data do not show a human figure in the picture, such as if the participant at that computing device has gotten up and stepped away for a while, it is more likely that the accompanying audio stream from that computing device is not necessary to distribute in the video communication session 42 and is appropriate for muting. Smart mute module 44 may therefore select for automatic muting at least one of the audio streams from one of the computing devices with a video stream that is determined not to be conveying video data representing a human figure.

In various examples, when users 14A-F also use computing devices 20A-F to send and receive document data for a document application, such as to share a document and enter inputs to navigate through the document, smart module 44 may also evaluate the document data as another factor to use in selecting audio streams to mute or refrain from muting. For example, video communication module 40 may receive document data for a document application, such as a presentation file for a presentation application (or a "slide deck" application), from computing device 20A. The document application may be another web application running on server device 12, and the document data video communication module 40 receives from computing device 20A may be user inputs to access and navigate through the document, in one example; or the document application may be running on computing device 20A, in another example. Video communication module 40 may distribute the document data among the at least some of computing devices 20A-F to enable the document to be displayed on computing devices 20A-F.

Smart module 44 may also base its selection of which audio streams to mute or not at least in part on which of computing devices 20A-F is sending document data for the document application. This may include not only document data from the user who initially shared the document, but also document data representing inputs from another one or more users who are navigating through, making edits to, or otherwise manipulating the document. The smart mute module 44 may make selections that reflect the idea that a user who is sharing a document, or entering inputs to navigate through or manipulate the document, is more likely to be an intended speaker that the other participants intend to listen to. The smart mute module 44 may therefore refrain from selecting audio streams to mute and to refrain from distributing when those audio streams are from computing devices that are sharing or sending document data, while smart mute module 44 may be more likely to select other audio streams to mute from computing devices that are not sharing or sending document data for the document. In other words, selecting a group of the audio streams to refrain from distributing may be based at least in part on selecting one or more of the audio streams other than an audio stream received from the computing device from which the document data is received, to refrain from distributing, while distributing the audio stream from the computing device from which the document data is received.

Smart module 44 may implement changes in the muting state of video communication session 42 by indicating the change in muting state to video communication module 40. Such indications or communications between smart module 44 and video communication module 40 may take any of a variety of forms, and may be a useful abstraction in various examples of a smart mute functionality interacting with the management of video communication session 42 and/or video communication module 40. For example, smart mute module 44 may be or include a method, class, library, subroutine, or other object within a larger communication application that may also include video communication module 40 or that may be video communication module 40.

Each of computing devices 20A-F may connect to others of computing devices 20A-F, or to any other number of computing devices through server device 12. In other examples, computing devices 20A-F may connect directly to each other. That is, any two of computing devices 20A-F or other computing devices may be connected together in a peer-to-peer fashion, either directly or through network 16. A peer-to-peer connection may be a network connection that partitions tasks or workloads between peers (e.g., a first computing device 20A and a second computing device 20B) without centralized coordination by a server (e.g., server 12). Computing devices 4-1 and 4-2 may exchange communication data such as audio streams 46A-F and video streams 48A-F via a peer-to-peer connection. In other examples, any combination of computing devices 20A-F may communicate in a peer-to-peer manner.

While various examples are described with each of computing devices 20A-F transmitting a single audio stream 46 and video stream 48, any or all of computing devices 20A-F may also capture and transmit multiple audio streams 46 and/or video streams 48. For example, users 14E1 and 14E2 are both using computing device 20E together. As seen in participant panels 26A and 26B on display screens 20A and 20B respectively in the example of FIG. 1, users 14E1 and 14E2 both appear together in a single video feed which may be generated by a single camera on computing device 20E. In another example, computing device 20E may include multiple cameras and/or microphones, or have multiple cameras and/or microphones either operatively attached to it, operatively in communication with it, or included in it, and users 14E1 and 14E2, and potentially additional users, may each orient a separate camera on themselves and speak into their own individual microphone. Computing device 20E may then send multiple audio streams 46E1, 46E2, etc. and/or multiple video streams 48E1, 48E2, etc. to server 12. Server 12 may then evaluate and distinguish among the multiple audio streams 46E1, 46E2, etc. from computing device 20E individually, and potentially select one of these audio streams to mute while refraining from muting another one or more of these audio streams. For example, if smart mute module 44 evaluates properties of the audio streams to be consistent with user 14E1 speaking to the other participants in video communication session 42 while user 14E2 is remaining quiet or conversing intermittently in the background with other passersby, smart mute module 44 may select an audio stream from user 14E2 to mute while refraining from muting the audio stream from user 14E1, in this example.

A video communication session as used herein is a broad term that encompasses its plain and ordinary meaning, and includes but is not limited to one or more objects, which may be stored in and/or be executable by hardware, which may enable communication client devices coupled to the one or more objects to exchange information. The one or more objects may include data and/or provide functionality of a video communication session as described herein. For instance, video communication session 42 may include data that, among other things, specifies client computing devices 20A-F coupled to video communication session 42. Video communication session 42 may further include session information such as a duration of video communication session 42, security settings of video communication session 42, and any other information that specifies a configuration of video communication session 42. Web server 38 may send and receive information from client computing devices 20A-F coupled to video communication session 42 thereby enabling users participating in the video communication session 42 to exchange information.

Web server 38, as shown in FIG. 2, may perform one or more operations that enable communication application 86 running on any one of computing devices 20A-F to communicate with video communication module 40 executing on server device 12 and to initiate or access video communication session 42. In various examples, communication application 86 on one of computing devices 20A-F may include functionality to send an initiation request to server device 12 to create or initiate video communication session 42. Server device 12 may communicatively couple computing device 20A-F to video communication session 42 in response to receiving one or more initiation requests. Web server 38 may generate, manage, and terminate video communication sessions such as video communication session 42.

Figure 3:
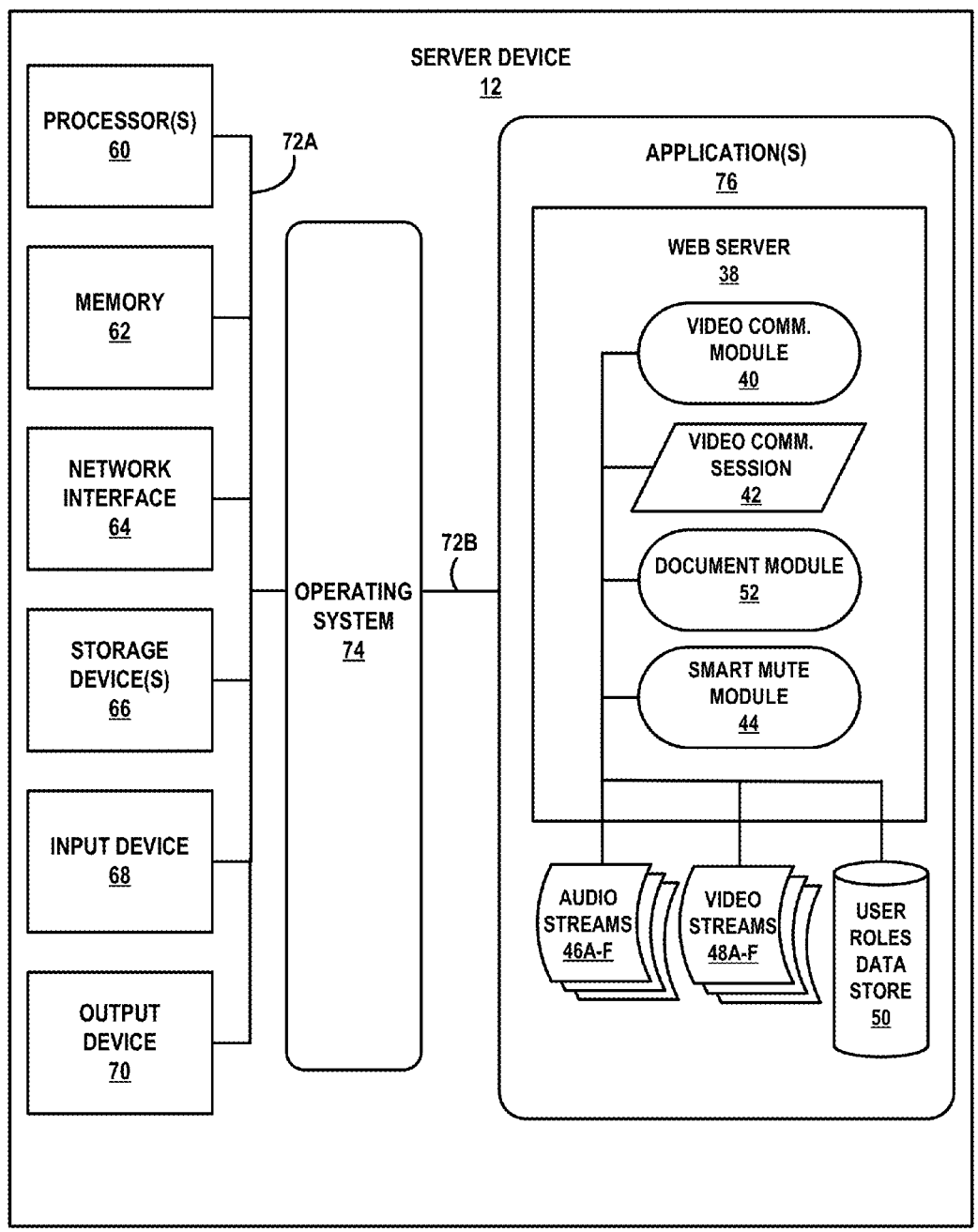
FIG. 3 is a block diagram illustrating further details of one example of a server device that may execute a video conferencing session with automatic mute control as shown in FIGS. 1 and 2, in accordance with one or more aspects of the present disclosure.

FIG. 3 is a block diagram illustrating further details of one example of server device 12 shown in FIGS. 1 and 2. FIG. 3 illustrates only one particular example of server device 12, and many other example embodiments of server device 12 may be used in other instances. Additionally, one or more of computing devices 20A-F shown in FIGS. 1 and 2 may be similar to server device 12 as shown in FIG. 3 or include any or all of the features depicted for server device 12 as shown in FIG. 3.

As shown in the example of FIG. 3, server device 12 includes one or more processors 60, memory 62, a network interface 64, one or more storage devices 66, input device 68, and output device 70. Server device 12 may include one or more of any of these components, and one or more types or sub-components of any of these components. Server device 12 also includes an operating system 74 that is executable by server device 12. Server device 12, in the example of FIG. 3, further includes web server 38 that is also executable by server device 12. Each of components 60, 62, 64, 66, 68, 70, 74, 76, 38, 40, 42, 52, 44, 50, and 76 as well as data streams 46 and 48 may be interconnected physically, communicatively, and/or operatively by communication channels 46, 72A, 72B for inter-component communications. Communication channels 46, 72A, 72B may include any type of bus, communication fabric, or other type of element for communicating data.

Processors 60, in one example, are configured to implement functionality and/or process instructions for execution within server device 12. For example, processors 60 may be capable of processing instructions stored in memory 62 or instructions stored on storage devices 66.

Memory 62, in one example, is configured to store information within server device 12 during operation. Memory 62, in some examples, may be described as a computer-readable storage medium. In some examples, memory 62 is a temporary memory, meaning that long-term storage is not a primary purpose of memory 62. Memory 62, in some examples, may be a volatile memory, such that memory 62 does not maintain stored contents when the computer is turned off. This may include random access memory (RAM), dynamic random access memory (DRAM), static random access memory (SRAM), and other forms of volatile memory known in the art. In some examples, memory 62 is used to store program instructions for execution by processors 60. Memory 62, in one example, is used by software or applications running on server device 12 (e.g., applications 76) to temporarily store information during program execution.

Storage devices 66, in some examples, also include one or more computer-readable storage media. Storage devices 66 may be configured to store larger amounts of information than memory 62. Storage devices 66 may further be configured for long-term storage of information. In some examples, storage devices 66 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Server device 12, in some examples, also includes a network interface 64. Server device 12, in one example, utilizes network interface 64 to communicate with external devices via one or more networks, such as one or more wireless networks. Network interface 64 may be a network interface card, such as an Ethernet card, an optical transceiver, a radio frequency transceiver, or any other type of device that can send and receive information. Other examples of such network interfaces may include Bluetooth®, 3G and WiFi® radios in mobile computing devices, as well as Universal Serial Bus (USB). In some examples, server device 12 utilizes network interface 64 to wirelessly communicate with an external device such as computing devices 20A-F of FIGS. 1 and 2.

Server device 12, in one example, also includes one or more input devices 68. Input device 68, in some examples, may be configured to receive input from a user through audio, tactile, or video feedback. Examples of input device 68 include a presence-sensitive screen, a mouse, a keyboard, a voice responsive system, a video camera, a microphone, or any other type of device for detecting a command from a user.

One or more output devices 70 may also be included in server device 12. Output device 70, in some examples, is configured to provide output to a user using tactile, audio, or video output. Output device 70, in one example, includes a presence-sensitive screen and may utilize a sound card, a video graphics adapter card, or any other type of device for converting a signal into an appropriate form understandable to humans or machines. Additional examples of output device 70 include a speaker, a cathode ray tube (CRT) monitor, a liquid crystal display (LCD), or any other type of device that can generate intelligible output to a user.

Server device 12 may include operating system 74. Operating system 74, in some examples, controls the operation of components of server device 12. For example, operating system 74, in one example, facilitates the interaction of one or more applications 76 (e.g., web server 38) with processors 60, memory 62, network interface 64, storage device 66, input device 68, and output device 70.

As shown in FIG. 3, web server 38 may include video communication module 40, video communication session module 42, and smart mute module 44, as described above with reference to FIGS. 1 and 2. Applications 76, web server 38, video communication module 40, video communication session module 42, and smart mute module 44 may each include program instructions and/or data that are executable by server device 12. For example, video communication session module 42 and smart mute module 44 may include instructions that cause web server 38 executing on server device 12 to perform any one or more of the operations and actions described in this disclosure.

Video communication module 40, document module 52, and smart mute module 44 are each referred to as "modules" in the most generic sense that they are portions of machine-readable code in any form, and are not meant to limit them to any particular form or particular type of division of machine-readable code. For example, video communication module 40 may be a stand-alone video communication session application and document module 52 may be a stand-alone document application, while smart mute module 44 may be incorporated as a method or class that forms part of the video communication session application or is called by the video communication session application, and that makes calls to or otherwise communicates with the document application 52. In other examples, video communication module 40 and smart mute module 44 may each be implemented as one or more methods, classes, objects, libraries, subroutines, or other portions of machine-readable code as part of a larger application. In other examples, video communication module 40, document module 52, and smart mute module 44 may each be stand-alone applications that communicate with each other. In other examples, video communication module 40 may be an application that has already been running on server device 12, and smart mute module 44 may be a new patch or upgrade to video communication module 40 or part of a new version of video communication module 40.

In various examples, video communication module 40 may be implemented as a version of any one of the Google+ (i.e. "Google Plus"), Gmail, iGoogle, Orkut, or other web applications operated by Google Inc. of Mountain View, Calif. The smart mute module 44 may be implemented as a new feature of the video conferencing capability of any one or more of these web applications. The document module 52 may be implemented as a version of the Google Docs web application operated by Google Inc., for example. The document module 52 may serve as a document application for documents in the form of presentations, word processing documents, spreadsheets, drawings, forms, or other types of documents, and may be used in conjunction with video communication module 40 and may communicate with video communication module 40 and/or smart mute module 44, for example. These examples are provided with the understanding that new features and new versions of these web applications are frequently implemented, and various aspects of this disclosure may be implemented as novel aspects of versions of these examples, rather than existing in prior versions. The video communication module 40 incorporating the functionality of smart mute module 44 may be adapted to run a client user interface in any of a variety of browser applications, dedicated video conferencing applications, or other applications, on any of a number of different desktop, laptop, tablet, smartphone, or other computing devices running any of a variety of different traditional or mobile operating systems.

Web server 38 may use any of a variety of tools or technologies for implementing the functions described herein. In various examples, web server 38 may be programmed using Java. In various examples, web server 38 may use server-side JavaScript, and may use the V8 JavaScript engine developed by Google Inc. and/or libraries for server-side JavaScript. Any action performed by any element or feature comprised in or running on server device 12 may in general be attributed to server device 12. Any of the functions of server device 12 described herein may also equivalently be abstracted among multiple servers, a data center, or any combination of servers and/or data centers.

In accordance with aspects of the present disclosure, smart mute module 44 shown in FIG. 3 may evaluate one or more properties of the audio streams 46; select a first group of the audio streams 46 to refrain from distributing to the client computing devices 20A-F (as shown in FIGS. 1 and 2) in the video communication session 42, based at least in part on one or more properties of the audio streams 46; and communicate to the video communication module 40 to refrain from distributing the first group of audio streams, as described in this disclosure.

Web server 38 also includes user roles data store 50, communicatively accessible to video communication module 40 and smart mute module 44. User roles data store 50 may include information associated with one or more of users 14A-F, such as user roles of users 14A-F within a company or other enterprise. Smart mute module 44 may receive and use information from user roles data store 50 in addition to properties of audio streams 46A-F in evaluating whether to mute any of audio streams 46A-F, such that smart mute module 44 may select one or more of audio streams 46A-F to refrain from distributing in video communication session 42 based at least in part on the user roles indicated in user roles data store 50.

For example, user roles data store 50 may provide data on user roles that includes data indicating that computing device 20A is associated with user 14A and that user 14A is the CEO of the company. In other examples, user roles data store 50 may provide data showing that user 14A has another senior position within an enterprise. User roles data store 50 may provide user role data showing that computing devices 20B-E are associated with users 14B-E, and its user role data may include specific information on the user roles of 20B-E. This user role data may show that users 20B-E have positions below the senior position in the enterprise. The user roles data store 50 may not have user role data associated with user 14F or computing device 20F that user 14F is using and that is connected to video communication session 42. For example, user 14F may be a participant from outside the enterprise to which the other users belong, or may be new and not yet have his data incorporated in user roles data store 50.

Smart mute module 44 may respond in any of a variety of ways to the user role data it receives from user roles data store 50, or that it doesn't receive from user roles data store 50 in the case of a user such as user 14F. For example, smart mute module 44 may base a selection of one or more audio streams to mute based at least in part on selecting audio streams 46B-F received from computing devices 20B-F associated with the users who have positions below user 14A's position as CEO, or other senior position in the enterprise. Smart mute module 44 may then indicate to video communication module 40 to mute or to refrain from distributing audio streams 46B-F in video communication session 42.

This selection may be based only in part on the user role information, as well as on the properties of the audio streams 46A-F themselves, so this does not mean that smart mute module 44 simply mutes users 14B-F and allows the audio stream from user 14A to be distributed in video communication session 42 to users 14B-F, in this example. Rather, smart mute module 44 may take the audio stream properties and the user role data into account, and potentially also along with further data, such as document application data being sent in video communication session 42, in this example. For instance, smart mute module 44 may generally rely in the first instance on properties of the audio streams, such as audio signals distinguishing between human speech clearly intended for video communication session 42 versus side conversations, ambient noise, or other background noise, but also bias its decisions toward allowing user 14A to speak to the other users and muting one or more of the other users 14B-F when there are conflicting signals on who is currently intending to speak to the other users. Smart mute module 44 may also evaluate any of these and other forms of data according to complex algorithms that may be adapted or refined through expert rules design, pattern recognition, machine learning, or any other techniques.

User roles data store 50 may include any suitable data structure to store information, such as a database, lookup table, array, linked list, etc. In one example, user roles data store 50 may include user identifiers that identify users 14A-F associated with computing devices 20A-F coupled to server device 12. User roles data store 50 may contain information related to a profile of a participant, including but not limited to an identity of the participant, a designation of the participant for the video communication session 42 (e.g., moderator, host, presenter, etc.), a geographical location of the user, or other information. Additional information may be included in user roles data store 50 pertaining to statistics of a particular user 14, including, for example, how much time a given user 14 has been an active speaker in the current video communication session 42 and/or previous video communication sessions, for example. Smart mute module may include any of these factors in its evaluations as well, such as biasing toward refraining from muting a user whose user role indicates she is the moderator or main presenter for the current video conferencing session, and biasing toward muting the other participants; or raising the likelihood of unmuting other participants as the length of time one speaker has been speaking increases, for example.

Additional client-side user roles data stores (not depicted in FIG. 3) may, in some examples, also be included on one or more of computing devices 20A-F, and may update user roles data store 50 on web server 38 during video communication session 42. User roles data store 50 may execute a query on the client-side user roles data stores on computing devices 20A-F when their users initially join video communication session 42, and update its information as may be warranted from the data it receives from the client-side user roles data stores on computing devices 20A-F, in this example.

Figure 4:
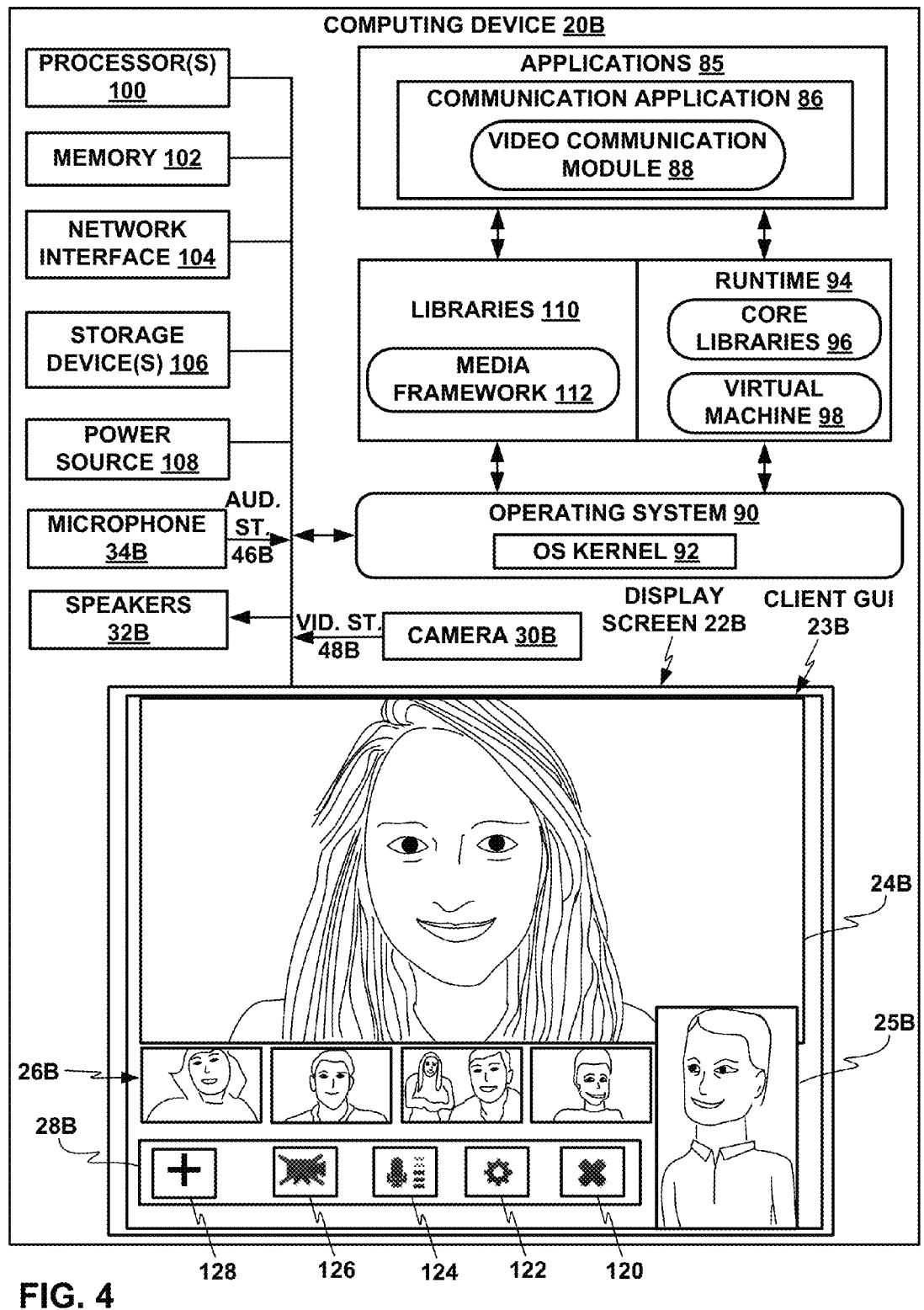
FIG. 4 is a block diagram illustrating further details of one example of a client computing device that may participate in a video conferencing session with automatic mute control as shown in FIGS. 1 and 2, in accordance with one or more aspects of the present disclosure.

FIG. 4 is a block diagram illustrating further details of example computing device 20B of FIGS. 1 and 2 with a client graphical user interface (GUI) 23B that displays multimedia content including video feeds of video conferencing session participants, as encoded by video streams of a video communication session, on display screen 22B, in accordance with aspects of the present disclosure. Computing device 20B as shown in FIG. 4 is a schematic block diagram view of example computing device 20B running client GUI 23B displayed on display screen 22B as shown in FIGS. 1 and 2. Display screen 22B and client GUI 23B are depicted as part of the block diagram format of FIG. 4 and are not intended to necessarily represent actual physical orientation or proportion in relation to the other depicted elements or computing device 20B as a whole. Various aspects of computing device 20B as shown in FIG. 4 may be similarly applicable to various others of computing devices 20A-F as shown in FIGS. 1 and 2, while others of computing devices 20A-F as shown in FIGS. 1 and 2 may have significant variations or differences compared with the features depicted in FIG. 4. For example, computing device 20B may be a tablet computer and the illustrative aspects shown in FIG. 4 may be focused on mobile computing devices such as tablet computers and smartphones, while other computing devices 20 may take other forms, such as laptop computers or desktop computers, or other examples as mentioned above.

As shown in the example of FIG. 4, computing device 20A includes one or more processors 100, memory 102, a network interface 104, one or more data storage devices 106, power source 108, one or more microphones 34B, one or more speakers 32B, one or more cameras 30B, and display screen 22B, which may be a touchscreen or presence-sensitive screen in the example of computing device 20B. Computing device 20B also includes operating system 90 that may be stored on one or more storage devices 106 and execute on one or more processors 100. Each of components 100, 102, 104, 106, 108, 34B, 32B, 30B, 22B, and 90 may be interconnected (physically, communicatively, and/or operatively) for inter-component communications.

Operating system 90, in various examples, may control the operation of components of computing device 20A, and facilitate operation of higher-level software applications. Computing device 20A, in this example, further includes applications 85 including communication application 86 that is also executable by computing device 20A. Operating system 90, in one example, facilitates the interaction of communication application 86 with processors 100, memory 102, network interface 104, data storage device 106, power source 108, one or more microphones 34B, one or more speakers 32B, one or more cameras 30B, and display screen 22.

As shown in FIG. 4, communication application 86 may include video communication module 88. Communication application 86 and video communication module 88 may each include program instructions and/or data that are executable by computing device 20A or by at least one of the one or more processors 100 of computing device 20A. For example, communication application 86 and/or communication module 88 may include computer-executable software instructions that cause computing device 20A to perform one or more of the operations and actions described in the present disclosure. In various examples, operating system 90 and communication application 86 may include code and/or data that are stored on one or more data storage devices 106 and that are read and executed or processed by one or more processors 100, and may in the process be stored at least temporarily in memory 102.

In this illustrative implementation of computing device 20A, operating system 90 may include an operating system kernel 92, which may include various device drivers, kernel extensions, and kernel modules, for example. Operating system 90 may also interact with a set of libraries 110, which may include various more or less standard, specialized, and/or proprietary libraries, such as a media framework 112, which may implement various basic functions for controlling the content displayed on display screen 22B, including the video feed content and other content provided by communication application 86.

In this illustrative implementation of computing device 20B, operating system 90 may also interact with a runtime 94, which includes various core libraries 96 as well as a virtual machine 98, which may be the Dalvik virtual machine in one example implementation. Virtual machine 98 may abstract certain aspects and properties of computing device 20B and allow higher-level applications to run on top of virtual machine 98, so that software code in the higher-level applications is compiled into bytecode to be executed by the virtual machine 98.

For example, software for applications such as communication application 86 may be written in C, which may be executable as native code by computing device 20B, or may also be written in Java, then compiled to virtual-machine-executable bytecode to be executed by virtual machine 98. As one illustrative example, libraries 110 may include the Standard C Library (libc), which provides native support for C functions. In different implementations, the operating system 90 and/or the virtual machine 98 may be able to execute code written in various other languages such as Objective-C, C++, JavaScript, Python, Ruby, Clojure, or Go, for example, either natively, or compiled into a virtual machine-executable bytecode, or compiled into an assembly language or machine code native to the CPU of computing device 20A, for example. Various examples may not use a virtual machine, and use applications that run natively on the computing device 20A or that use some other technique, compiler, interpreter, or abstraction layer for interpreting a higher-level language into code that runs natively on computing device 20A.

In various examples, computing device 20A may also have various application programming interfaces (APIs) that are native to operating system 90 and that run on top of operating system 90, and which are intended to provide resources that automate or facilitate higher-level applications that access the one or more APIs. These one or more APIs may include object libraries or other libraries, toolsets, or frameworks, and may be associated with a native programming environment for writing applications. Computing device 20B may also have a different specific organization of APIs, libraries, frameworks, runtime, and/or virtual machine associated with or built on top of operating system 90 other than the example organization depicted in FIG. 4.

Higher level applications, such as communication application 86, may therefore make use of any of various abstractions, properties, libraries, or lower-level functions that are provided by any of operating system 90, OS kernel 92, libraries 110, media framework 112, runtime 94, core libraries 96, virtual machine 98, or other compilers, interpreters, frameworks, APIs, or other types of resources, or any combination of the above, with which computing device 20B is configured, to enable functions such as sending audio stream 46B and video stream 48B from microphone 34B and camera 30B to server device 12, displaying a video feed based on video stream 48B in source video feed 25B in client GUI 23B, receiving other audio streams 46 and video streams 48 from server device 12 as part of a video communication session 42, display video feeds in the participant panel 26B and/or the multimedia content 24B in client GUI 23B based on the other video streams 48 received from server device 12, and provide an audio output via speakers 32B based on the other audio streams 46 received from server device 12

The one or more processors 100, in various examples, may be configured to implement functionality and/or process instructions for execution within computing device 20B. For example, processors 100 may be capable of processing instructions stored in memory 102 or instructions stored on data storage devices 106. Computing device 20B may include multiple processors, and may divide certain tasks among different processors. For example, processors 100 may include a central processing unit (CPU), which may have one or more processing cores. Processors 100 may also include one or more graphics processing units (GPUs), and/or additional processors. Processors 100 may be configured for multi-threaded processing. Processors 100 and/or operating system 90 may divide tasks among different processors or processor cores according to certain criteria, such as to optimize graphics rendering or to optimize the user experience. For example, processors 100 and/or operating system 90 may reserve a particular processing thread or processor or processing core, or a portion thereof, for certain tasks such as rendering translational motion of graphical elements, or for rendering still images or video frames within a video output, such as video feeds and other graphical elements displayed in client GUI 23B.

Various tasks or portions of tasks may also be divided among different layers of software and hardware. For example, a processing thread may oversee higher-level management of video display, while being configured to push much of the processing burden of decoding and rendering the graphics for video feeds through GPU hardware that is optimized for the task.

Memory 102, in various examples, may be configured to store information within computing device 20B during operation. Memory 102, in various examples, may be a computer-readable storage medium. In various examples, memory 102 is a temporary memory, and computing device 20B relies more on one or more data storage devices 106 than memory 102 for long-term storage. Memory 102, in various examples, may be a volatile memory, meaning that memory 102 does not maintain stored contents for a long duration of time once it is powered down, such as when computing device 20B is turned off. Examples of volatile memories that may characterize memory 102 include random access memories (RAM), dynamic random access memories (DRAM), static random access memories (SRAM), and other forms of volatile memories. In various examples, memory 102 may be used to store program instructions for execution by processors 100. Memory 102, in various examples, may be used by software or applications running on computing device 20B to temporarily store data and/or software code during execution of an application.

One or more data storage devices 106, in various examples, may include a computer-readable storage medium or multiple computer-readable storage media. Data storage devices 106 may be configured to store larger amounts of information than memory 102. Data storage devices 106 may further be configured for long-term storage of information. In various examples, data storage devices 106 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories. In other examples, memory 102 may also be configured for long-term data storage, and any of a variety of technologies may blur the lines between memory and data storage and between volatile and non-volatile. Memory 102 and data storage devices 106 may also include any of various caches, buffers, and other temporary memories that may be incorporated at any of various levels of a processing architecture and with various latency and capacity profiles, including a dedicated cache exclusive to a processing core or processing chip.

Computing device 20B, in various examples, may also include a network interface 104. Computing device 20B, in one example, utilizes network interface 104 to communicate with external devices, such as server device 12, via one or more networks, which may include one or more wireless networks. Network interface 104 may be or include a network interface card, such as an Ethernet card, an optical transceiver, a radio frequency transceiver, or any other type of component that is configured to send and receive information. Other examples of such network interfaces may include Bluetooth®, 3G and WiFi® radios configured for mobile computing devices, as well as USB. In various examples, computing device 20B may use network interface 104 to communicate wirelessly with an external device such as server device 12 of FIGS. 1-3 or other networked computing device, such as during a video communication session 42.

Computing device 20B, in various examples, may also include one or more input and/or output devices such as display screen 22B, which may be configured to display client GUI 23. Display screen 22B may include a liquid crystal display (LCD) display screen or display screen that uses another type of graphical output technology. Display screen 22B is also a touchscreen, that comprises an electrically capacitive layer sensitive to the presence of touch and configured to translate the positions of touch inputs, and the motions of touch inputs as they change position over time, into signals to provide to a driver for the touchscreen or other feature for receiving the information on the touch inputs, in the example of computing device 20B.

Computing device 20B may also include or be configured to connect with any of a variety of other input and/or output devices such as physical buttons, a physical keyboard, a mouse, a touchpad, a trackball, a voice user interface system, an accelerometer, a vibration component, a sound card, a video graphics adapter card, or any other type of device for detecting and/or interpreting inputs from a user or for converting a signal into a form of graphical, audio, tactile, or other form of user output that can be sensed by a user.

Computing device 20B, in various examples, may include one or more power sources 108, which may be rechargeable and provide power to computing device 20B. Power source 108, in various examples, may be a lithium-ion battery, a nickel-cadmium battery, a nickel-metal hydride battery, or other suitable power source.

In various examples, all of or portions of communication application 86 and/or video communication module 88 may be a part of or native to operating system 90, libraries 110, and/or runtime 94. In various examples, communication application 86 may receive input through network interface 104 of computing device 20B. Computing device 20B may, for example, receive audio streams 46 and video streams 48 through network interface 104 from a network-connected server device such as server device 12 shown in FIGS. 1-3.

Client GUI 23B of FIG. 4 may be generated by video communication module 88 executing in communication application 86 on client device 10. Communication application 86 may be a social networking application, an email application, a dedicated video communication application, a web browser application, a web feed reader application, for example. In various examples, communication application 86 may be implemented as a version of a client-side mobile application of the Google+, Gmail, iGoogle, Orkut, or other applications provided by Google Inc., and configured for any of a variety of different mobile device operating systems or mobile device manufacturers or models. Communication application 86 may exchange data and instructions back and forth with a web application running on a remote server, such as server device 12 of FIGS. 1-3. Video communication module 88 may include one or more objects, methods, classes, libraries, subroutines, applications, or any other portions of software for implementing features of the client-side video conferencing user interface such as client GUI 23B.

As shown in FIG. 4, client GUI 23B includes multimedia content 24B, source video feed 25B, participant panel 26B, and control panel 28B. As depicted in FIG. 4, multimedia content 24B is displaying a video feed for one of the participants in the video communication session, and participant panel 26B is displaying video feeds for the other participants in the video communication session. As discussed herein, multimedia content 24B may also display any kind of multimedia content, including video, documents, images, animations, or any other visual output. In some examples, multimedia content 24B and participant panel 26B may be accompanied by one or more audio feeds other audio output.

In some examples, client GUI 23B includes participant panel 26B. Participant panel 26B may include one or more video feeds or other representations for the other participants in the video communication session (e.g., users associated with other client computing devices 20 coupled to a video communication session). For example, participant panel 26B may include video feeds encoded by video streams from video input devices of computing devices 20A and 20C-F of FIGS. 1 and 2, while computing devices 20A and 20C-F are coupled to video communication session 42 hosted by server device 12 as shown in FIG. 3. As discussed herein, smart mute module 44 running on server 12 may configure video communication module 40 on server device 12 to control whether or when audio feeds are provided together with any one or more of the video feeds being displayed in multimedia content 24B and participant panel 26B in client GUI 23B on computing device 20B. The audio feeds may be encoded by audio streams based on audio data received via audio input devices on each of the other computing devices 20A and 20C-F, with the audio streams received by video communication module 40 running on server device 12.

The video feeds in multimedia content 24B and participant panel 26B in client GUI 23B and accompanying audio feeds may include representations of visual expressions and actions and audible sounds of users 14A-F using computing devices 20A-F coupled to video communication session 42. For instance, camera 30B of computing device 20B may generate visual data encoded in a video stream 48B that conveys the visual appearance and expressions of user 20B. Computing device 20B may send the video data as a video stream 48B to server device 12, which may then distribute the video stream to the other computing devices 20A and 20C-F participating in the video communication session 42. Computing device 20B may also render the video feed encoded in video stream 48B within client GUI 23B as source video feed 25B. In this way, user 14B may see his own visual appearance and expressions in source video feed 25B as they may also appear in video feeds in multimedia content 24A, 24C-F or participant panels 26A, etc. (participant panels not depicted for computing devices 20C-F in FIGS. 1 and 2) on other computing devices 20A and 20C-F participating in video communication session 42.

In various examples, video communication module 40 on server device 12 may also receive an audio stream 46B that encodes an audio feed of audio input received by computing device 20B, and that may include user 14B's conversation or other audio expressions while user 14B is viewing multimedia content 24B. For example, microphone 34B of computing device 20B may generate audio stream 46B of data representing audible sounds from user 14B or from the ambient environment around user 14B. Computing device 20B may send audio stream 46B to server device 12. In some examples, computing device 20B may also include audio processing capability for filtering out at least some ambient environmental sounds as opposed to spoken word input from user 14B before sending audio stream 46B to server device 12, where audio stream 46B may be received by video communication module 40.

Smart mute module 44 may then evaluate one or more properties of audio stream 46B, potentially together with one or more other criteria, and indicate or communicate to video communication module 40 if smart mute module 44 selects audio stream 46B to mute, i.e. to refrain from distributing in the video communication session. Video communication module 40 may then distribute audio stream 46B in the video communication session 42 if smart mute module 44 does not indicate that it has selected audio stream 46B to mute, while video communication module 40 may refrain from distributing audio stream 46B in the video communication session 42 if smart mute module 44 does indicate that it has selected audio stream 46B to mute.

This particular arrangement is one example, and in other examples, smart mute module 44 may affirmatively indicate to video communication module 40 for each individual audio stream 46 whether it is selected to mute or to distribute, or smart mute module 44 may indicate to video communication module 40 only those audio streams 46 that it has selected to distribute. Video communication module 40 may use a default of distributing all audio streams 46 in the video communication session 42 unless it is notified by smart mute module 44 that one or more audio streams 46 are selected to mute, or video communication module 40 may use a default of refraining from distributing any of audio streams 46 in the video communication session 42 unless it is notified by smart mute module 44 that one or more audio streams 46 are selected to distribute, or video communication module 40 may not use a default of its own, and follow whatever the most recent indications are from smart mute module 44 of whether to mute or to distribute any one or more of audio streams 46.

When video communication module 40 distributes any one or more of the audio streams 46 in the video communication session 42, server device 12 may distribute those audio streams to any or all of computing devices 20A-F that are participating in video communication session 42, while it may refrain from distributing any given one of audio streams 46 back to whichever one of computing devices 20A-F from which it originated. For example, as video communication module 40 receives audio stream 46B from computing device 20B, if smart mute module 44 does not select audio stream 46B to refrain from distributing in video communication session 42, server device 12 may distribute audio stream 46B to the rest of the computing devices 20A and 20C-F that are participating in the video communication session 42. If smart module 44 has not selected any of audio streams 46 to mute, server device 12 may distribute each of the audio streams 46A-F to each of the other computing devices 20A-F that are participating in the video communication session 42, other than the computing device from which each audio stream originated. In some examples, server device 12 may also distribute an audio stream 46 back to its source computing device 20 from which it originated. Any given one of computing devices 20A-F may output audio feeds from all the audio streams 46 it is receiving in the video communication session 42. For example, computing device 20B may output audio feeds from all the audio streams 46 it is receiving in the video communication session 42 via speakers 32B.

In some examples, users may select a video feed to display as multimedia content 24B. For example, user 14B using computing device 20B may select one of one or more video feeds displayed in participant panel 26B to display as multimedia content 24B. Participant panel 26B may at one point in time show video feeds from all five of the other computing devices 20A and 20C-F participating in video communication session 42, and user 14B may select the video feed from computing device 20A for enlarged display in multimedia content 24B, as is shown in FIG. 4. The video feed from computing device 20A is based on video stream 48A as received and distributed by server device 12, and that outputs video data and audio data of user 14A. In one example, multimedia content 24B may initially show the video feed from the user's own computing device 20B, and then move the display of the video feed from the user's own computing device 20B to source video feed 25B in the corner of client GUI 23B as shown in FIG. 3 once the user selects one of the other video feeds to display in multimedia content 24B. Client GUI 23B may also manipulate the content of the participant panel 26B as the state of the video communication session 42 changes, such as by adding and removing video feeds as other participants join or leave video communication session 42, or changing the positions or sizes with which the video feeds are displayed, for example.

As seen in FIG. 4, client GUI 23B may also include control panel 28B. Control panel 28B may include one or more control buttons that enable user 14B to control various functions of video communication module 88 and/or computing device 20B. For example, control panel 64 may include control buttons 120, 122, 124, 126, and 128, as shown in FIG. 4. In this example, a user may select control button 120 to exit the video communication session 42; control button 122 enables a user to control the settings for video communication session 42; control button 124 enables a user to manually mute the audio input from the user's computing device 20B, and refrain from sending an audio stream 46B to server device 12; control button 126 enables a user to manually block the video input from the user's computing device 20B, and refrain from sending a video stream 48B to server device 12; and control button 128 enables a user to select additional multimedia content to access and contemporaneously display in the video communication session 42.

Control button 122 for controlling the settings for video communication session 42 may enable a user to select from among options for who may be invited to video communication session 42, what permissions other participants in video communication session 42 may have, what video feeds or other content is displayed in multimedia content 24B, or for adjusting security settings, for example. Control button 122 for controlling the settings for video communication session 42 may enable a user to select a smart mute feature of video communication module 40. By controlling the settings in a menu accessed via control button 122, the user may turn the smart mute feature off or on, and control whether the smart mute module 44 running on server device 12 is activated and performs smart mute functions for the video communication session 42. In various examples, the capability of opting whether or not to engage the smart mute function may be reserved for an initiator of the video communication session 42, a user with administrative permissions, or other class of user other than general participants in video communication session 42.

The additional multimedia content accessed with control button 128 may be a document for a document application, for example, that a user may share with the other participants of the video communication session 42 and have it displayed in the client GUIs of the other participants' computing devices 20A and 20C-F. This may be a document in a presentation application, in a word processing application, in a spreadsheet application, in a text editor application, in an integrated development environment (IDE) application, in a scientific publishing application, or any other kind of application. The document application may be document module 52 running on server device 12 as shown in FIG. 3, or it may be running locally on the user's computing device 20B, in various examples. The user of computing device 20B, or other participants in the video communication session 42, may enter inputs for manipulating the document, such as by moving between slides in a presentation application document, or scrolling through a word processing application or a text editor application, for example.

Control button 128 may also enable the user to access any of a variety of other types of additional media, such as a video file, an image file, an audio file, a website, a user interface for a separate web application or locally hosted application, a user interface for a database or other data store, a game, or any other type of content or application. In whatever case, and wherever the additional multimedia content is filed, the user may be able to share the additional multimedia content with the other users in the video communication session 42.

While certain features are displayed in the examples of client GUI 23B as depicted in FIG. 4 and as described above, other examples a client GUI for a video communication application of the present disclosure may include more, fewer, or other variations of features than the examples discussed above, either in accordance with user-selected options, by default, or by implementation. For example, in another option that a user may select, the multimedia content 24B may be expanded to a full-screen view, such that source video feed 25B, participant panel 26B, and control panel 28B are all removed from the material displayed in client GUI 23B and multimedia content 24B is expanded to fill the entire real estate of display screen 22B or of client GUI 23B. In another example, a user may select an option in which the multimedia content 24B is expanded to a full-screen view occupying the entire real estate of display screen 22B or of client GUI 23B except for a relatively small region in one corner or off to one side in which source video feed 25B is still displayed, such as how source video feed 25B is displayed in FIG. 4, so that the user still retains a view of his own video feed while the rest of the client GUI 23B is filled with the view of multimedia content 24B, for example.

Figure 5:
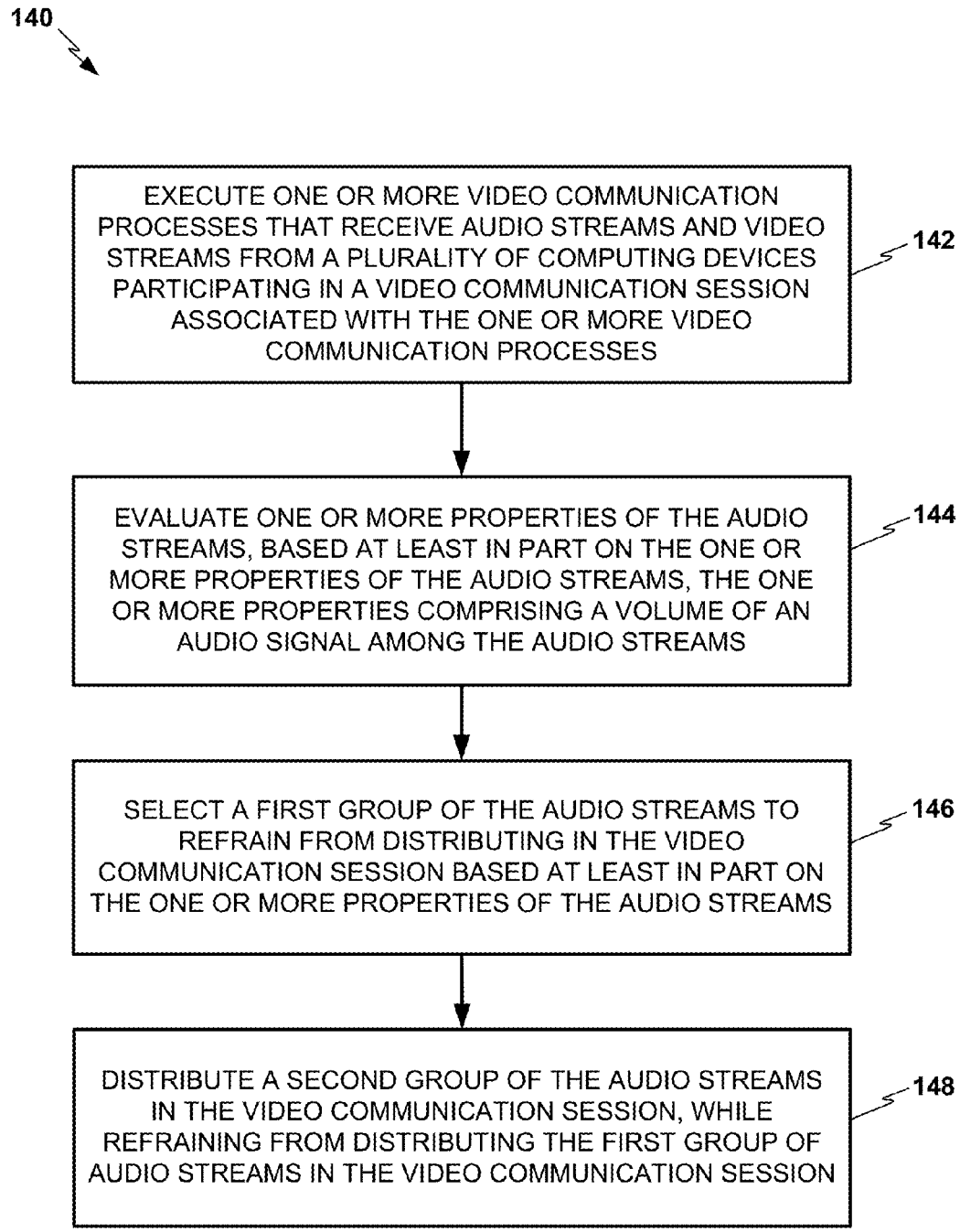
FIG. 5 is a flow diagram illustrating an example process that may be performed by a server device or other computing device to implement a video conferencing application with automatic mute control, in accordance with an illustrative example.

FIG. 5 is a flow diagram illustrating an example process 140 or method that may be performed by or embodied in a computing device, such as server device 12 of FIGS. 1-3 and/or computing devices 20A-F of FIGS. 1, 2, and 4, to implement automatic muting in a video conferencing session, in accordance with an illustrative example. Process 140 is only one example, and other implementations may include more or fewer aspects than those depicted in FIG. 5. For purposes of illustration, the example process 140 is described within an example video communication context involving server device 12 and two or more of computing devices 20A-F as depicted in FIGS. 1-4.

In process 140, a server device 12 may execute one or more video communication processes, such as video communication module 40, which receive audio streams 46A-F and video streams 48A-F from a plurality of computing devices 20A-F participating in a video communication session 42 associated with the one or more video communication processes (142). Video communication module 40 may evaluate one or more properties of the audio streams 46A-F (144), such as the volume of their audio signals or audio signal characteristics that correspond to either clearly articulated human speech or background noise, in various illustrative embodiments, and may evaluate additional information together with the properties of the audio streams 46A-F, such as the video streams 48A-F, user role data (e.g. associated with user roles data store 50), or document application input (e.g. associated with document module 52), in various illustrative embodiments. Video communication module 40 may select a first group of the audio streams 46A-F to refrain from distributing in the video communication session 42, based at least in part on the one or more properties of the audio streams (146), and potentially also based at least in part on any additional data that video communication module 40 evaluates. Video communication module 40 may distribute a second group of the audio streams 46A-F in the video communication session 42, while refraining from distributing the first group of audio streams in the video communication session 42 (148).

Various techniques described herein may be implemented in software that may be written in any of a variety of languages, making use of any of a variety of toolsets, frameworks, APIs, programming environments, virtual machines, libraries, and other computing resources, as indicated above. For example, software code may be written in Java, C, Objective-C, C++, Go, Python, Ruby, Scala, Clojure, assembly language, machine code, or any other language. As one specific illustrative example, aspects of the disclosure discussed above may be implemented in a software module written in Java that is executable on virtual machine 98 of FIG. 4, which may be the Dalvik virtual machine, for example.

In one example, the video conferencing web application may be written in Java but be configured to provide content in JavaScript in the users' browsers on the client computing devices. For example, the web application may use Java servlets and may include functionality to optimize JavaScript, to dynamically generate HTML in Java and JavaScript, and to access JavaScript libraries for supporting DOM, AJAX, and JSON functions across different types of client computing devices and browsers. In another example, the web application may use server-side JavaScript, and may be configured for providing JavaScript content to the browsers and for compiling server-side JavaScript to machine code for accelerating performance on the server, for example. In other examples, all or portions of the web application may also be written in Python, Ruby, Clojure, or any other programming language. In other examples, the video conferencing application comprising the smart mute module may run directly on one or more computing devices that are involved in the client-facing video conferencing interface.

The browser may use a video conferencing API plug-in and/or a plug-in for configuring a communications protocol and/or associated libraries for video conferencing. In one example, the video conferencing web application uses an Extensible Messaging and Presence Protocol (XMPP) interface, and the browsers on the client computing devices use a communications plug-in configured for using XMPP with libraries for operating a video conferencing interface over RTP and/or RTMP. For example, the communications plug-in may be configured with the libjingle library to implement the Jingle protocol for video conferencing. In another example, the web application may use the SIP protocol. The web application may be configured for suitable video and audio standards, such as the H.264 standard for video processing and the G.711 standard for audio processing, for example. Any other suitable technologies or standards for web servers, browsers or applications configured for video conferencing, video processing, and audio processing may also be used in various examples.

The smart mute module and the video communication module may both be incorporated in a web application. The smart mute module may be configured for asynchronous input/output with the video communication module, and be configured to monitor audio feeds continuously and make rapid decisions when to send an output for muting or unmuting any of the audio feeds.

In other examples, the smart mute module may be a separate application or part of a separate application and communicate with a video conferencing web application or a client-side video conferencing application or plug-in, or a browser or other program otherwise configured for video conferencing. Different aspects of evaluating properties of the audio streams 46A-F or other data may be divided among different layers of software between server device 12 and computing devices 20A-F, in various embodiments. For example, the video communication module 88 running on one of computing devices 20A-F may include an asynchronous event notification API that communicates a notification to video communication module 40 running on server device 12 when the video communication module 88 running on one of computing devices 20A-F detects a relevant user input to control panel 28A-F, a relevant change in the audio stream 46A-F or video stream 48A-F, or a relevant update in user role data for the user 14A-F of the particular computing device 20A-F.

Aspects of the disclosure may be equally applicable and implemented in any browser or operating system, and using any other APIs, frameworks, or toolsets. Aspects described herein for transmission, decoding, and rendering of data for video output or video content, which may be considered interchangeably herein with media output or media content that also includes audio output or audio content, may make use of any protocol, standard, format, codec, compression format, HTML element, or other technique or scheme for encoding, processing, decoding, rendering, or displaying an audio output or a video output.

Various techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), flash memory, magnetic or optical data storage media, and the like. In various examples, an article of manufacture may comprise one or more computer-readable storage media.

In various examples, the data storage devices and/or memory may comprise computer-readable storage media that may comprise non-transitory media. The term "non-transitory" may indicate that the storage medium is not embodied in a carrier wave or a propagated signal. In certain examples, a non-transitory storage medium may store data that can, over time, change (e.g., in RAM or cache). Machine-readable code may be stored on the data storage devices and/or memory, and may include executable instructions that are executable by at least one processor. "Machine-readable code" and "executable instructions" may refer to any form of software code, including machine code, assembly instructions or assembly language, bytecode, software code in C, or software code written in any higher-level programming language that may be compiled or interpreted into executable instructions that may be executable by at least one processor, including software code written in languages that treat code as data to be processed, or that enable code to manipulate or generate code.

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

The various embodiments described above and depicted in FIGS. 1-5, as well as additional embodiments, are within the scope of the following claims.

What is claimed is:

1. A method comprising:
executing, by a first computing device, one or more video communication processes that receive audio streams and video streams from a plurality of computing devices participating in a video communication session associated with the one or more video communication processes;
evaluating, by the first computing device, one or more properties of the audio streams from the plurality of computing devices, the one or more properties comprising a volume of an audio signal among the audio streams;
receiving, by the first computing device, document data for a document application from a second computing device included in the plurality of computing devices;
selecting, by the first computing device, a first group of the audio streams from the plurality of computing devices to mute in the video communication session, based at least in part on the one or more properties of the audio streams;
outputting, by the first computing device, a second group of the audio streams from the plurality of computing devices for distribution in the video communication session, while muting the first group of audio streams from the plurality of computing devices in the video communication session; and
outputting, by the first computing device, the document data for distribution among the plurality of computing devices to enable the document data to be displayed on at least one of the computing devices;
wherein selecting the first group of the audio streams is based at least in part on selecting one or more of the audio streams other than an audio stream received from the second computing device, and wherein outputting the second group of the audio streams comprises outputting the audio stream received from the second computing device.

2. The method of claim 1, further comprising:
evaluating an average volume of an audio signal of one or more of the audio streams;
identifying one of the audio streams that has a highest average volume of its audio signal from among the audio streams evaluated;
selecting one or more remaining audio streams that do not have the highest average volume for the first group of the audio streams; and
outputting for distribution, in the video communication session, the identified audio stream that has the highest average volume, while muting in the video communication session the selected one or more remaining audio streams that do not have the highest average volume.

3. The method of claim 2, wherein evaluating the average volume of the audio signal in one or more of the audio streams comprises evaluating a volume of the audio signal in each of the audio streams over an interval of time.

4. The method of claim 3, wherein the interval of time is between one second and ten seconds inclusive.

5. The method of claim 1, further comprising:
outputting the video streams received from each of the plurality of computing devices in the video communication session.

6. The method of claim 1, further comprising:
wherein each of the audio streams is based at least in part on audio data captured by an audio input device associated with a respective one of the computing devices, and each of the video streams is based at least in part on video data captured by a video input device associated with a respective one of the computing devices.

7. The method of claim 1, further comprising:
receiving from a third computing device among the plurality of computing devices an input for manipulating a document represented by the document data; and
wherein selecting the first group of the audio streams is based at least in part on selecting one or more of the audio streams other than an audio stream received from the third computing device from which the input for manipulating the document is received, and wherein outputting the second group of the audio streams comprises outputting the audio stream from the third computing device from which the input for manipulating the document is received.

8. The method of claim 1, further comprising:
receiving data on user roles for users associated with one or more of the computing devices;
wherein selecting the first group of the audio streams is based at least in part on the user roles.

9. The method of claim 1, further comprising:
detecting a decrease in volume in an audio signal in the second group of the audio streams being distributed in the video communication session; and
in response to detecting the decrease in volume in the audio signal in the second group of the audio streams, outputting for distribution, in the video communication session, the first group of the audio streams that were previously selected to mute.

10. The method of claim 9, wherein detecting a decrease in volume in the audio signal in the second group of the audio streams comprises evaluating the audio signal in the second group of the audio streams over multiple intervals of time.

11. The method of claim 10, wherein evaluating the audio signal in the second group of the audio streams over multiple intervals of time comprises evaluating the audio signal in the second group of the audio streams over intervals of between one second and ten seconds inclusive.

12. The method of claim 1, further comprising:
detecting an increase in volume in an audio signal in a first audio stream from among the first group of the audio streams; and
in response to detecting the increase in volume in the audio signal in a first audio stream, outputting the first audio stream for distribution in the video communication session.

13. A method comprising:
executing, by a first computing device, one or more video communication processes that receive audio streams and video streams from a plurality of computing devices participating in a video communication session associated with the one or more video communication processes;
evaluating, by the first computing device, one or more properties of the audio streams from the plurality of computing devices, the one or more properties comprising a volume of an audio signal among the audio streams;
selecting, by the first computing device, a first group of the audio streams from the plurality of computing devices to mute in the video communication session, based at least in part on the one or more properties of the audio streams; and
outputting, by the first computing device, a second group of the audio streams from the plurality of computing devices for distribution in the video communication session, while muting the first group of audio streams from the plurality of computing devices in the video communication session;
wherein evaluating one or more properties of the audio streams comprises evaluating one or more of the audio streams to determine whether the audio streams are conveying human speech from a single speaker; and
wherein selecting the first group of the audio streams to mute comprises selecting at least one of the audio streams that is not conveying human speech from a single speaker.

14. The method of claim 13, further comprising:
detecting a decrease in volume in an audio signal in the second group of the audio streams being distributed in the video communication session; and
in response to detecting the decrease in volume in the audio signal in the second group of the audio streams, outputting for distribution, in the video communication session, the first group of the audio streams that were previously selected to mute.

15. A method comprising:
executing, by a first computing device, one or more video communication processes that receive audio streams and video streams from a plurality of computing devices participating in a video communication session associated with the one or more video communication processes;
evaluating, by the first computing device, one or more properties of the audio streams from the plurality of computing devices, the one or more properties comprising a volume of an audio signal among the audio streams;
evaluating, by the first computing device, one or more of the video streams to determine whether the video streams are conveying video data that represents a human figure;
selecting, by the first computing device, a first group of the audio streams from the plurality of computing devices to mute in the video communication session, based at least in part on the one or more properties of the audio streams; and
outputting, by the first computing device, a second group of the audio streams from the plurality of computing devices for distribution in the video communication session, while muting the first group of audio streams from the plurality of computing devices in the video communication session;
wherein selecting the first group of the audio streams to mute comprises selecting at least one of the audio streams from one of the plurality of computing devices with a video stream that is not conveying video data representing a human figure.

16. The method of claim 15, further comprising:
receiving data on user roles for users associated with one or more of the computing devices;
wherein selecting the first group of the audio streams is based at least in part on the user roles.

17. A first computing device, comprising:
at least one processor;
wherein the at least one processor is configured to:
   receive audio streams and video streams via a network interface from a plurality of client computing devices participating in a video communication session associated with one or more video communication processes;
   receive document data for a document application from a second computing device among the plurality of client computing devices;
   evaluate one or more properties of the audio streams from the plurality of client computing devices;
   select a first group of the audio streams from the plurality of client computing devices to refrain from outputting for distribution to the client computing devices in the video communication session, based at least in part on one or more properties of the audio streams;
   output the video streams for distribution in the video communication session via the network interface;
   output the document data for distribution among the plurality of client computing devices to enable the document data to be displayed on the client computing devices; and
   output a second group of the audio streams from the plurality of client computing devices for distribution in the video communication session via the network interface, while refraining from distributing the first group of the audio streams in the video communication session;
   wherein selecting the first group of the audio streams to refrain from outputting for distribution to the client computing devices in the video communication session is based at least in part on selecting one or more of the audio streams other than an audio stream received from the second computing device, and wherein outputting the second group of the audio streams for distribution comprises outputting the audio stream from the second computing device.

18. The first computing device of claim 17, wherein the at least one processor is further configured to:
   evaluate an average volume of an audio signal of one or more of the audio streams;
   identify one of the audio streams that has a highest average volume of its audio signal from among the audio streams evaluated;
   select one or more remaining audio streams that do not have the highest average volume for the first group of the audio streams; and
   output for distribution, in the video communication session, the identified audio stream that has the highest average volume, while refraining from outputting for distribution in the video communication session the selected one or more remaining audio streams that do not have the highest average volume.

19. The first computing device of claim 17, wherein the first computing device is a server.

20. The first computing device of claim 17, wherein the at least one processor is further configured to:
   receive, from a third computing device among the plurality of client computing devices, an input for manipulating a document represented by the document data;
   wherein selecting the first group of the audio streams to refrain from outputting for distribution to the client computing devices in the video communication session is based at least in part on selecting one or more of the audio streams other than an audio stream received from the third computing device from which the input for manipulating the document is received, and wherein outputting the second group of the audio streams comprises outputting the audio stream from the third computing device from which the input for manipulating the document is received.

* * * * *